No. 662,556. Patented Nov. 27, 1900.
J. J. BRIX.
FILTERING APPARATUS.
(Application filed Apr. 28, 1899.)

(No Model.)

Witnesses.
R. W. Sommers

Inventor
Joseph Johann Brix
by Henry J. Miller
Atty.

United States Patent Office.

JOSEPH JOHANN BRIX, OF WIESBADEN, GERMANY, ASSIGNOR TO ALLGEMEINE STÄDTEREINIGUNGS-GESELLSCHAFT MIT BESCHRÄNKTER HAFTUNG, OF SAME PLACE.

FILTERING APPARATUS.

SPECIFICATION forming part of Letters Patent No. 662,556, dated November 27, 1900.

Application filed April 28, 1899. Serial No. 714,863. (No model.)

*To all whom it may concern:*

Be it known that I, JOSEPH JOHANN BRIX, a subject of the German Emperor, residing at Wiesbaden, in the Province of Hesse-Nassau and Kingdom of Prussia, Germany, have invented a new and useful Filtering Apparatus, of which the following is a specification.

My invention relates to improvements in filtering apparatus in which a revolving drum or barrel is designed for the reception of the filtering material through which the liquid to be purified is to flow in order to be discharged through a hollow shaft or trunnion; and the objects of my improvements are to adapt the filtering apparatus of this class for many purposes of the trade, including that of drain-water-purifying works in towns, and to carry out the same in an exceptionally complete and effective manner, so that while the cost of the filtering apparatus is low, the space it occupies small, and the operation simple such apparatus is capable of dealing with large quantities of liquid. I attain these objects by the mechanism and arrangement of parts illustrated in the accompanying drawings, in which—

Figure 1:
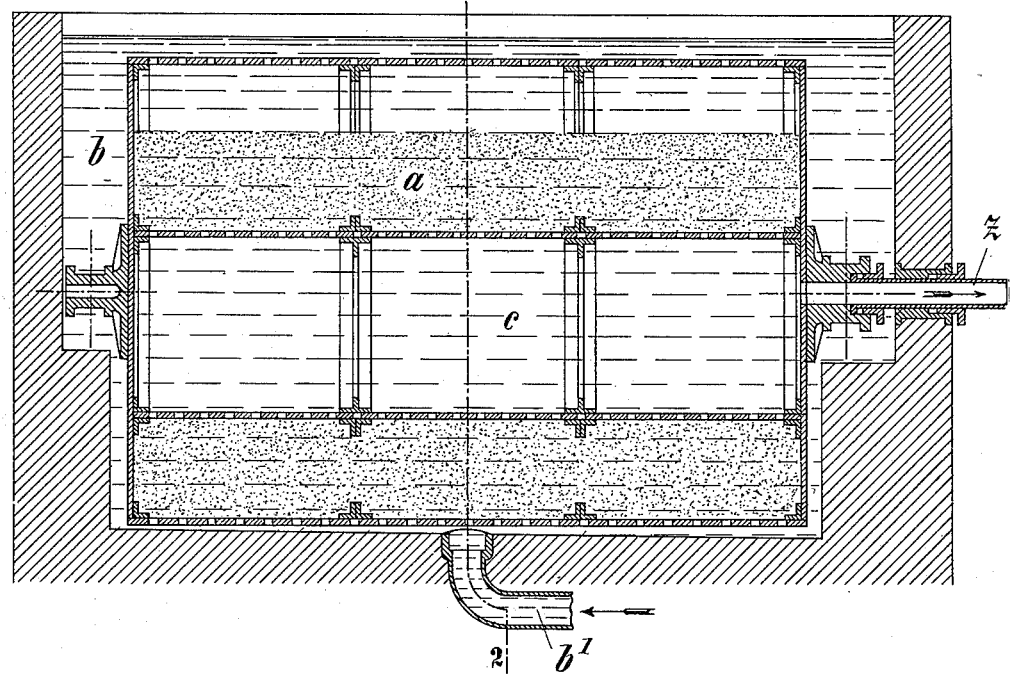
Figure 2:
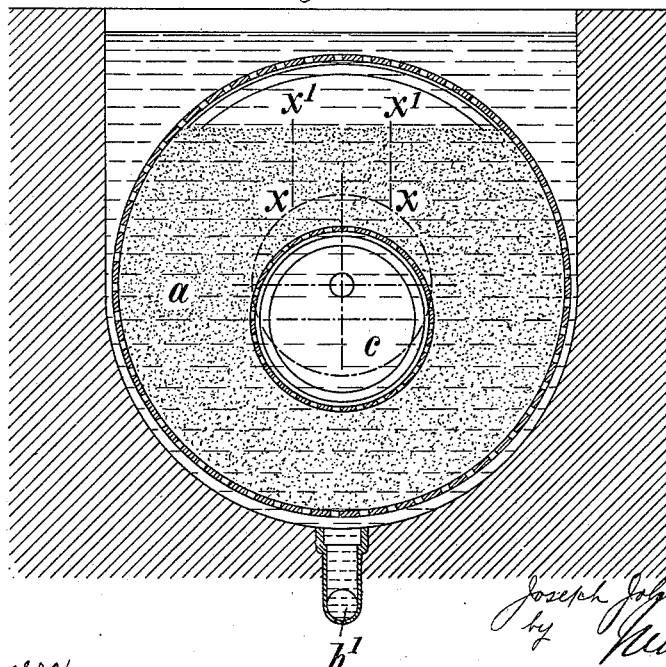

Figure 1 is a vertical longitudinal section of the entire filtering apparatus; and Fig. 2, a cross-section on the line 1 2, Fig. 1.

Similar letters refer to similar parts throughout the several views.

The filtering apparatus consists of a basin or reservoir $b$, which may be either open or closed at the top and which serves for the reception of the liquid to be purified, a revolving drum or barrel $a$, arranged within the said reservoir and serving as a receiver for the filtering material, such as sand, through which the liquid is to flow, and a tubular chamber $c$ arranged within the barrel $a$, which receives the liquid as it is purified and discharges it through a hollow shaft or trunnion $z$.

The liquid is delivered into the basin $b$ through a feed-pipe $b'$. It then passes through the perforated wall of the barrel $a$, through the filtering material, thence, after having been purified, through the perforated wall of the tubular chamber $c$, and from this it is discharged through the hollow trunnion $z$. During this passage of the liquid the barrel does not revolve.

Where the inner tubular chamber is arranged concentrically with the axis of the barrel, as indicated by dotted lines in Fig. 2, the upper part $x\ x$ of the tubular chamber should preferably be left unperforated, so as to prevent the liquid, after it has passed through the central layer $x'\ x'\ x\ x$ of the filtering material when possibly it has not yet had time to be thoroughly filtered, from entering the tubular chamber in an impure condition. The necessity of providing the inner chamber with an unperforated top may, however, be avoided and the entire surface of the said chamber may be used as a strainer by arranging such chamber eccentrically to the outer barrel, as illustrated in Fig. 2, as in that case all parts of it are sufficiently covered with filtering material, its capacity being nevertheless equal to that of a concentric tubular chamber.

The filtering-barrel is but partly filled with filtering material, an empty space being left in its upper part, so that the filtering material may from time to time be cleansed by a current of liquid being sent throughout while the barrel is rotated, it being at the same time set in motion or agitated owing to the said empty space and friction being set up among its parts or layers, whereby it is freed from loose particles of impurities.

Having fully described my invention, what I claim, and desire to secure by Letters Patent, is—

1. A filtering apparatus comprising an outer and an inner chamber, both having perforated walls, said inner chamber eccentric to the outer chamber and the latter partly filled with filtering material; in combination with a reservoir for the liquid to be filtered in which said filter is mounted so as to be immersed in the liquid therein, for the purpose set forth.

2. A filtering apparatus comprising a drum having perforated peripheral walls, an internal chamber having likewise perforated peripheral walls, the space between said drum and chamber partly filled with a granular filtering material, said drum having journals one of which is tubular and in communication with the internal chamber; in combination with a reservoir for the liquid to be filtered, through one of the walls of which the aforesaid tubular journal projects and in which reservoir the aforesaid filter is revolubly mounted so as to be immersed in the liquid therein, and means for feeding a cleansing liquid to the reservoir at a point below the filter, for the purpose set forth.

JOSEPH JOHANN BRIX.

Witnesses:
JEAN GRUND,
SIMON WOLFGANG HANAUER.